(12) United States Patent
Sanders

(10) Patent No.: US 11,718,364 B2
(45) Date of Patent: Aug. 8, 2023

(54) SUSPENSION FORK FOR A VEHICLE WHEEL

(71) Applicant: Henry Sanders, Hilton Head Island, SC (US)

(72) Inventor: Henry Sanders, Hilton Head Island, SC (US)

( * ) Notice: Subject to any disclaimer, the term of this patent is extended or adjusted under 35 U.S.C. 154(b) by 269 days.

(21) Appl. No.: 17/171,045

(22) Filed: Feb. 9, 2021

(65) Prior Publication Data

US 2022/0250710 A1 Aug. 11, 2022

(51) Int. Cl.
*B62K 25/08* (2006.01)
*F16C 3/03* (2006.01)

(52) U.S. Cl.
CPC ............... *B62K 25/08* (2013.01); *F16C 3/03* (2013.01)

(58) Field of Classification Search
CPC ......... B62K 25/08; F16C 3/03; F16C 2326/26
See application file for complete search history.

(56) References Cited

U.S. PATENT DOCUMENTS

| | | | | |
|---|---|---|---|---|
| 2,156,580 A | | 5/1939 | Best | |
| 2,477,748 A | * | 8/1949 | Hutchins | B62K 25/08 280/277 |
| 4,561,669 A | * | 12/1985 | Simons | B62K 25/08 180/219 |
| 4,966,257 A | * | 10/1990 | Axthammer | F16F 9/366 384/58 |
| 5,044,648 A | * | 9/1991 | Knapp | B62K 21/20 267/221 |
| 5,238,259 A | * | 8/1993 | Wilson | B62K 21/02 280/279 |
| 5,529,328 A | * | 6/1996 | Chang | B62K 25/08 280/275 |
| 6,145,862 A | * | 11/2000 | D'Aluisio | B62K 21/20 280/283 |
| 7,168,725 B2 | * | 1/2007 | Vilsmeier | B62K 25/16 280/279 |
| 7,178,820 B2 | | 2/2007 | Terblanche | |
| 8,157,660 B2 | * | 4/2012 | Disser | F16D 3/065 464/167 |
| 2008/0122190 A1 | * | 5/2008 | Lee | B62K 25/08 280/5.507 |
| 2011/0049833 A1 | * | 3/2011 | Kinzler | B62K 25/005 280/276 |
| 2017/0008596 A1 | * | 1/2017 | D'Aluisio | B62K 21/22 |

FOREIGN PATENT DOCUMENTS

| | | | | |
|---|---|---|---|---|
| WO | WO-0043261 A1 | * | 7/2000 | ............. B62K 25/08 |
| WO | WO-0129438 A1 | * | 4/2001 | ........... B60G 13/008 |
| WO | WO-2004020273 A1 | * | 3/2004 | ............. B62K 21/02 |

* cited by examiner

*Primary Examiner* — Minnah L Seoh
*Assistant Examiner* — Ryan Edward Hardy
(74) *Attorney, Agent, or Firm* — B. Craig Killough

(57) ABSTRACT

A pair of elongated housings are positioned generally parallel to each other for connection of a wheel to a vehicle. An elongated member comprising a plurality of rollers is positioned within each of the housings. Spring biasing urges the elongated members downwardly, with the spring biasing absorbing shocks received at the wheel and conveyed to the elongated members, causing movement of the elongated members within the housing. The series of rollers on each of the elongated members traverse the housing to reduce friction between the housing and the elongated member as the elongated members traverse the housing. At least one vehicle wheel is mounted to the elongated members.

20 Claims, 4 Drawing Sheets

SUSPENSION FORK FOR A VEHICLE WHEEL

BACKGROUND OF THE INVENTION

Many wheeled vehicles have one or more forks that connect one or more wheels to the frame of the vehicle. Examples of vehicles that employ forks to mount a wheel of a vehicle to a frame include bicycles, motorcycles, and tricycles. Frequently, the forks are rigidly mounted to the frame, and the fork does not act as a suspension for the wheel. There is a need for an improved suspension that can be employed on vehicles that employ forks to connect a wheel to the frame of the vehicle.

SUMMARY OF THE INVENTION

The present invention is a pair of elongated housings that are positioned generally parallel to each other to form a fork for connection of a wheel to a vehicle. An elongated member comprising a plurality of rollers is positioned within each of the housings. Biasing urges the elongated members downwardly, with the biasing absorbing shocks received at the wheel and conveyed to the elongated members, causing movement of the elongated members within the housing. The series of rollers on each of the elongated members traverse the housing to reduce friction between the housing and the elongated member as the elongated members traverse the housing. At least one vehicle wheel is mounted to the elongated members.

BRIEF DRAWING DESCRIPTION

DESCRIPTION OF PREFERRED EMBODIMENTS

Figure 1:
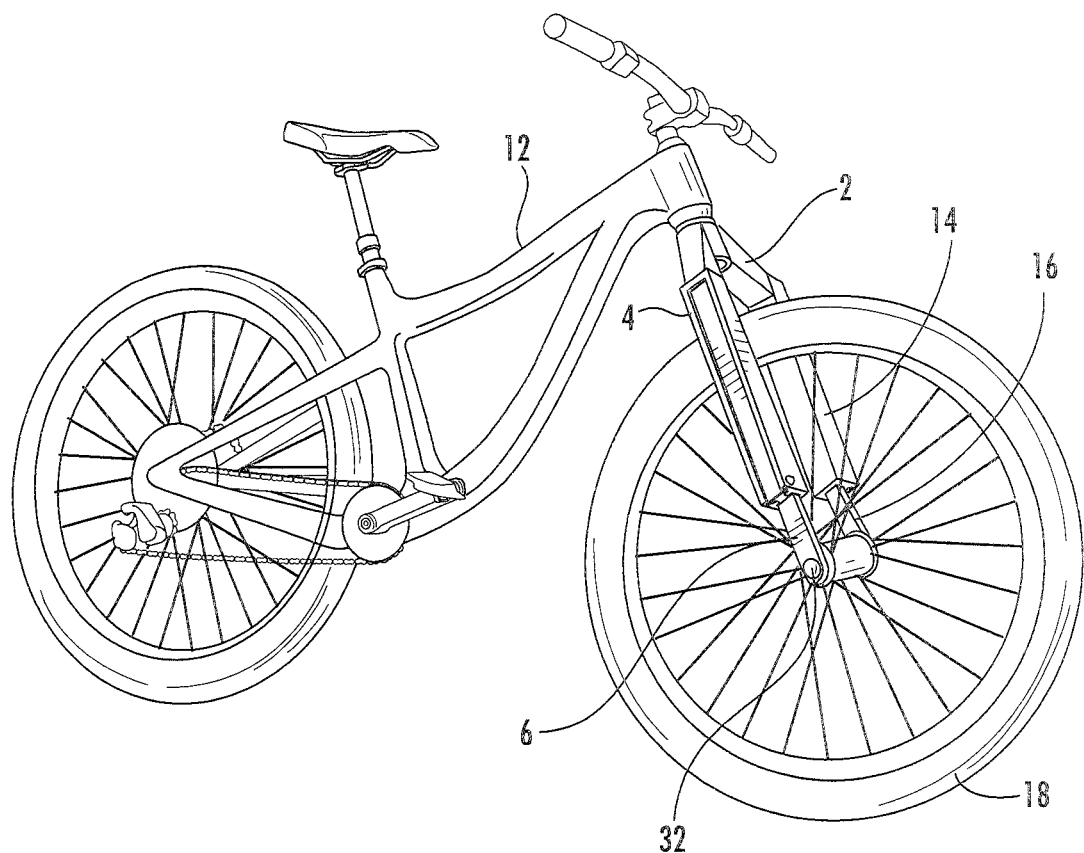
FIG. 1 is a perspective view of a bicycle having the suspension fork mounted to the frame, with a front wheel of the bicycle positioned within the fork.

FIG. 1 shows a bicycle having an embodiment of the suspension fork 2 of the present invention mounted to the frame 12 of the bicycle. A front wheel of the bicycle is positioned between the parallel housings 4, 14 for the suspension fork. In this embodiment, the elongated housings are generally parallel to each other, and are connected at the top of the housings. The suspension fork construct is attached to the bicycle frame. The front wheel 18 of the bicycle is mounted to elongated members 6, 16 that slidably engage and traverse the housings. The front wheel of the bicycle is then positioned between the housings while being mounted to the elongated members.

While the embodiment of the suspension fork as shown in FIG. 1 is mounted to a bicycle, the suspension fork, according to the present invention, can be used with other vehicles having similar forks, such as motorcycles, mopeds, bicycles and tricycles.

Figure 2:
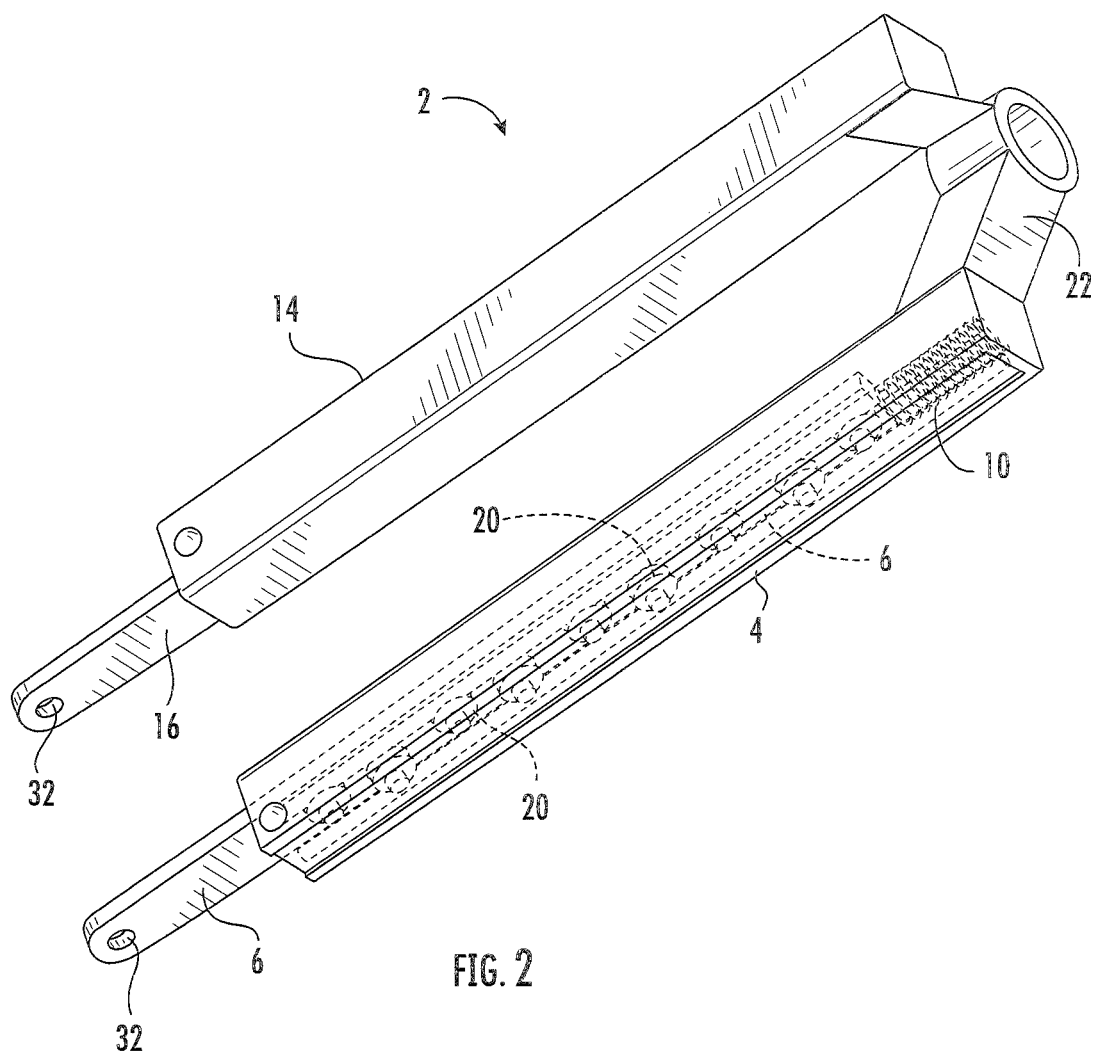
FIG. 2 is a perspective view of an example of a fork according to the invention, with internal components of the housing shown in dotted lines.

FIG. 2 shows an isolation of an embodiment of the suspension fork 2 according to the invention. FIG. 2 shows a first elongated housing 4 and a second elongated housing 14 that are positioned generally parallel to each other, with a connecting member 22 connecting the elongated housings 4,14 and holding them generally parallel to each other. The connecting member is mounted to the frame 12 of the wheeled vehicle, such as the bicycle. FIG. 2 shows as a phantom the internal elements of a first elongated member 6 as positioned within the first housing.

Figure 3:
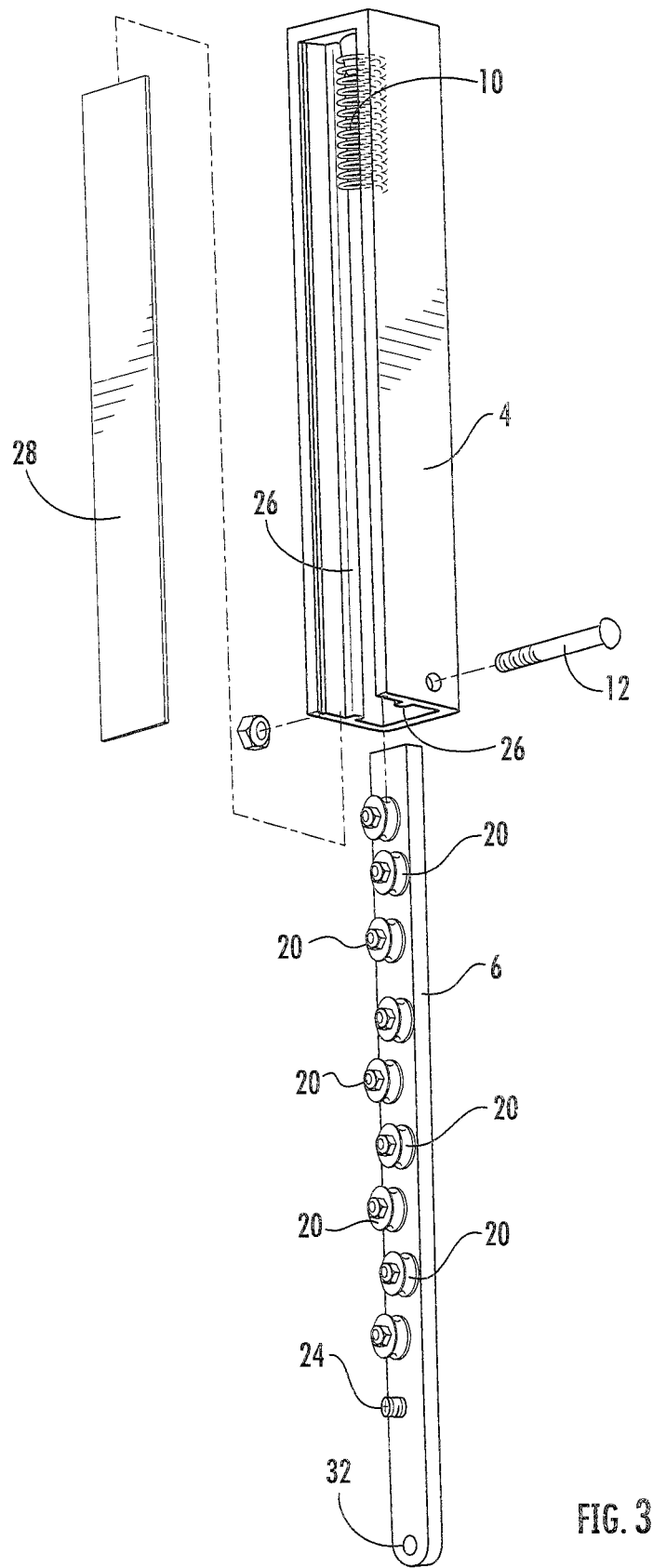
FIG. 3 is an exploded view of a housing of the suspension fork.
Figure 5:
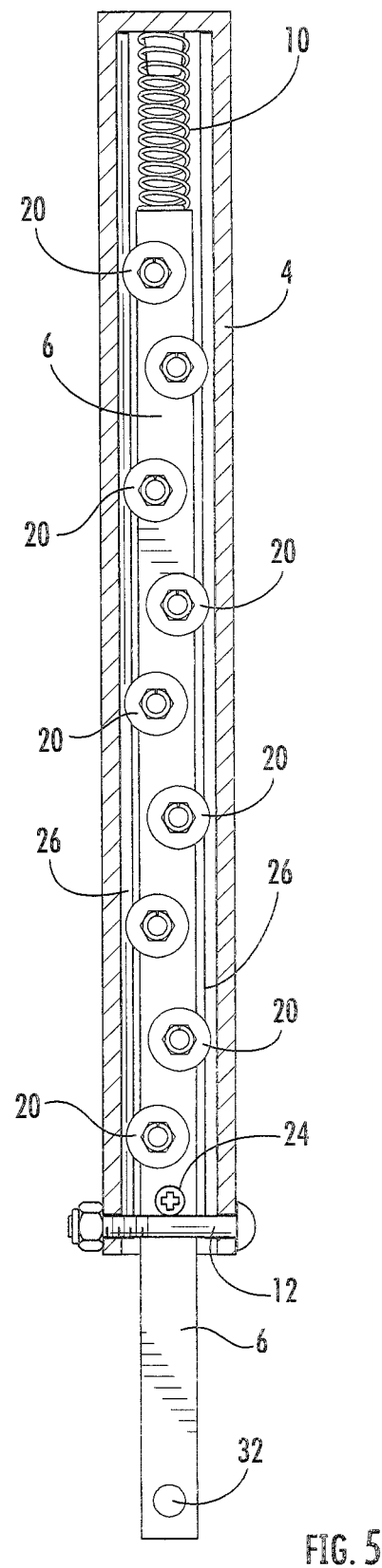
FIG. 5 is another sectioned view of one side of the suspension fork according to the invention.

A first elongated member 6 is positioned within the first elongated housing 4. Spring biasing 10 is provided between the first elongated member and the first elongated housing near a top of the first elongated housing. When the first elongated member is not under a load or force, spring biasing urges the first elongated member downwardly until the first elongated member contacts a stop 12 positioned in the elongated housing that limits travel of the first elongated member within the housing. As shown in FIG. 3 and FIG. 5, the stop 12 may be a pin, such as a nut and bolt, that contacts a limiting member 24 of the elongated member to limit travel of the elongated member. In preferred embodiment, the limiting stop that is mounted to the elongated member is formed for a resilient material, such as nylon or teflon or similar materials that are durable, but provide resiliency and cushioning as the limiting member contacts the stop of the elongated housing.

Figure 4:
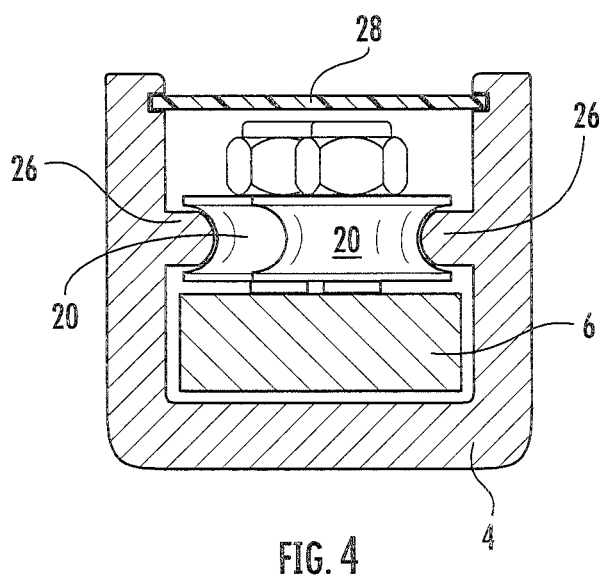
FIG. 4 is a sectioned view of one side of the suspension fork according to the invention.

As shown in FIG. 2, each of the first elongated member 6 and the second elongated member 16 comprise a plurality of rollers 20 mounted to the elongated member. The number of rollers and diameter of rollers employed may be varied according to the application and the length of the suspension fork. However, not fewer than four (4) rollers are preferred to be employed, and even more preferred at least six (6) rollers are employed, perhaps using rollers of smaller diameter. In the embodiment shown in FIG. 3, nine rollers are employed on one side of each elongated member with the rollers alternately staggered along the length of the elongated member. In the embodiment shown in FIG. 3, nine rollers are employed, and it may be beneficial to employ an odd number of rollers. The rollers act as bearings and reduce friction between the elongated housing and the elongated member as the elongated member traverses the elongated housing as forces impact the bicycle wheel. As shown in FIGS. 4 and 5, the rollers may be a plurality of wheels with center axles mounted on a side to the elongated member. The rollers each rotate around their center axle.

The elongated members slidably engage the housing. Upward travel is limited by the spring biasing 10 in the embodiment shown in FIG. 3, and downward travel of the elongated member is limited by the limiting member 24 and contact with the pin or stop 12. Travel of the elongated member can be limited by the length of the elongated member relative to the housing. That is, a shorter elongated member can be used with a relatively longer internal portion of the housing to permit more travel of the elongated member, as long as spring biasing is sufficient to maintain a required downward force on the elongated member.

The plurality of rollers 20 mounted to a side of the elongated members 6,16 reduce friction between the elongated housings 4,14 and the elongated members as the elongated members travel within the elongated housings. The rollers contact tongues 26 formed in the elongated housings. As shown in the drawings, a first tongue and a second tongue are formed on opposing sides of the housing. The rollers are alternating or staggered, so that every other roller contacts the same tongue, with the remaining rollers contacting the opposite tongue. FIG. 4 shows a sectioned view of the construct demonstrating a first roller contacting a first tongue, and a roller positioned immediately after the first roller contacting a second opposing tongue formed in the housing.

It is preferred that the elongated housings 4,14 are enclosed so as to prevent dirt and debris from entering the elongated housings, since dirt and debris may interfere with the operation of the rollers 20 and movement of the elongated members 6,16. However, access to the interior of the elongated housings is desirable so that such dirt and debris that enters the elongated housing can be cleaned and removed. As shown, the elongated housings are open on one side but comprise a panel 28 which slidably engages the side of the housing and can be removed for access to the interior of the elongated housings for cleaning of the suspension fork construct.

While in the preferred embodiment as shown in the drawings, a coiled spring 10 is employed for biasing to urge the elongated members 6,16 downwardly, other means of biasing to urge the elongated members downwardly may be employed. For example, a gas spring or gas strut may be used in place of a spring to provide biasing of the elongated member in a downward manner. Pressure of the biasing, whether spring biasing or gas spring or strut, can be adjusted or designed according to the service requirements and the weight of the vehicle to which the suspension fork is applied. For example, greater biasing pressure is preferred for a heavy motorcycle as opposed to a lightweight bicycle, so as to provide more resistance to forces on the wheel while also compensating for the weight of the vehicle itself.

The elongated members 6,16 are mounted to the wheel 18 of the vehicle at the slot or void 32 positioned on the elongated member and outside of the housing. FIG. 1; FIG. 2; FIG. 3, FIG. 5.

In use, the suspension fork is mounted to the wheeled vehicle, such as the bicycle in FIG. 1. Sufficient biasing is provided by a spring or gas pressure or other pressure device so as to urge the elongated members downwardly until the limiting member 24 contacts the stop 12. Sufficient biasing is present so as to compensate for the weight of the vehicle and the weight of the rider, plus other typical loads used with the vehicle.

As the vehicle travels, forces are applied to the suspension fork through the wheel. Forces applied to the wheel counter pressure on the elongated members supplied by the biasing. Such forces may arise from, for example, potholes in roads, or uneven terrain when the vehicle is off paved roads. Forces push the elongated members upwardly in the elongated housings and towards the spring or other biasing device which counters the force applied to the front wheel 18. The suspension fork thereby reduces the forces received by the frame 12 of the vehicle and the rider or operator of the vehicle.

What is claimed:

1. A suspension fork for a vehicle wheel, comprising:
   a first elongated housing,
   a biasing member,
   a first elongated member that slidably engages the first elongated housing, the first elongated member comprising a first plurality of rollers positioned on a side of the first elongated member and a second plurality of rollers positioned on the side of the first elongated member and along a length of the first elongated member, wherein the first plurality of rollers engage a first side of the first elongated housing and the second plurality of rollers engage a second side of the first elongated housing, and wherein an end of the first elongated member is urged away from the biasing member by the biasing member,
   a second elongated housing,
   a second biasing member,
   a second elongated member that slidably engages the second elongated housing, the second elongated member comprising a plurality of rollers positioned along a length of the second elongated member, wherein the plurality of rollers engage sides of the second elongated housing, and wherein an end of the second elongated member is urged away from the biasing member by the second biasing member, and
   wherein the first elongated housing and the second elongated housing are constructed and arranged to accept a vehicle wheel between the first elongated housing and the second elongated housing.

2. A suspension fork for a vehicle wheel as described in claim 1, wherein rollers of the first plurality of rollers and rollers of the second plurality of rollers of the first elongated member are alternately staggered.

3. A suspension fork for a vehicle wheel as described in claim 1, wherein the first elongated housing comprises a first tongue formed along a first side of the first elongated housing and a second tongue formed along a second side of the first elongated housing, and wherein the first plurality of rollers engage the first tongue and second plurality of rollers engage the second tongue, and travel of the first elongated member within the first elongated housing is guided by the engagement of the first tongue and the second tongue with the first plurality of rollers and the second plurality of rollers.

4. A suspension fork for a vehicle wheel as described in claim 1, wherein rollers of the first plurality of rollers and rollers of the second plurality of rollers of the first elongated member are alternately staggered, and wherein the first plurality of rollers of the first elongated member engage a first tongue formed along a first side of the first elongated housing, and the second plurality of rollers of the first elongated member engage a second tongue formed along a second side of the first elongated housing and travel of the first elongated member within the first elongated housing is guided by the engagement of the first tongue with the first plurality of rollers and the engagement of the second tongue with the second plurality of rollers.

5. A suspension fork for a vehicle wheel as described in claim 1, wherein a travel limiter is formed of a limiting member of the first elongated member that contacts a limiting member of the first elongated housing and limits travel of the first elongated member within the first elongated housing.

6. A suspension fork for a vehicle wheel as described in claim 1, wherein the first elongated housing is open on a side of the first elongated housing that is generally parallel to the first elongated member.

7. A suspension fork for a vehicle wheel as described in claim 1, wherein the first elongated housing is open on a side of the first elongated housing that is generally parallel to the first elongated member, wherein the open side of the elongated housing is adjacent to the side of the first elongated member on which the rollers are mounted.

8. A suspension fork for a vehicle wheel as described in claim 1, wherein the first elongated housing and the second elongated housing are joined at an upper end of the first elongated housing and an upper end of the second elongated housing, and the first elongated housing and the second elongated housing are in a generally parallel and spaced apart relationship.

9. A suspension member for a vehicle wheel, comprising:
an elongated housing,
a biasing member,
an elongated member that slidably engages the elongated housing, the elongated member comprising a first plurality of rollers positioned on the elongated member and along a length of the elongated member, wherein the first plurality of rollers engage a first side of the elongated housing in a tongue relationship between the first plurality of rollers and the first side of the elongated housing and a second plurality of rollers engage a second side of the elongated housing in a tongue relationship between the second plurality of rollers and the second side of the elongated housing, and wherein the elongated member is urged away from the biasing member by the biasing member.

10. A suspension fork for a vehicle wheel as described in claim 1, wherein the first side of the first elongated housing and the second side of the first elongated housing are opposite each other.

11. A suspension member for a vehicle wheel as described in claim 9, wherein the first side of the elongated housing and the second side of the elongated housing are opposite each other.

12. A suspension member for a vehicle wheel as described in claim 9, wherein the first plurality of rollers and the second plurality of rollers of the elongated member are alternately staggered.

13. A suspension member for a vehicle wheel as described in claim 9, wherein the elongated housing comprises a first tongue formed along a first side of the elongated housing and a second tongue formed along a second side of the elongated housing, and wherein the first plurality of rollers engage the first tongue and the second plurality of rollers engage the second tongue and travel of the elongated member within the elongated housing is guided by the engagement of the first tongue with the first plurality of rollers and the second tongue with the second plurality of rollers.

14. A suspension member for a vehicle wheel as described in claim 9, wherein rollers of the first plurality of rollers and rollers of the second plurality of rollers are alternately staggered, and wherein the first plurality of rollers of the elongated member engage a first tongue formed along a first side of the elongated housing, and the second plurality of rollers of the elongated member engage a second tongue formed along a second side of the elongated housing, and travel of the elongated member within the elongated housing is guided by the engagement of the first tongue with the first plurality of rollers and the engagement of the second tongue with the second plurality of rollers.

15. A suspension member for a vehicle wheel as described in claim 9, wherein a travel limiter is formed of a limiting member of the elongated member that contacts a limiting member of the elongated housing and limits travel of the elongated member within the elongated housing.

16. A suspension member for a vehicle wheel as described in claim 9, wherein the elongated housing is open on a side of the elongated housing that is adjacent to a side of the elongated member on which the rollers are mounted.

17. A suspension member for a vehicle wheel as described in claim 9, wherein the rollers are wheels each having a center axle, wherein the wheels rotate around the center axle.

18. A suspension member for a vehicle wheel as described in claim 9, wherein the elongated housing and a second elongated housing are joined at the end of the elongated housing and the second elongated housing, and the first elongated housing and the second elongated housing are in a generally parallel and spaced apart relationship.

19. A suspension member for a vehicle wheel as described in claim 9, further comprising a second elongated member that slidably engages a second elongated housing, the second elongated member comprising a plurality of rollers positioned along a length of the second elongated member, wherein the plurality of rollers engage sides of the second elongated housing, and wherein an end of the second elongated member is urged away from a biasing member of the second housing by the biasing member of the second housing, and
wherein the elongated housing and the second elongated housing are constructed and arranged to accept a vehicle wheel between the first elongated housing and the second elongated housing.

20. A suspension fork for a vehicle wheel as described in claim 1, wherein the rollers are wheels each having a center axle and the wheels rotate around the center axle.

* * * * *